United States Patent [19]

Patel

[11] Patent Number: 4,964,489

[45] Date of Patent: Oct. 23, 1990

[54] JET SPRAY SLINGER

[75] Inventor: Ajitkumar G. Patel, Oxford, Ohio

[73] Assignee: Dresser Industries, Inc., Dallas, Tex.

[21] Appl. No.: 286,975

[22] Filed: Dec. 20, 1988

Related U.S. Application Data

[63] Continuation-in-part of Ser. No. 117,757, Nov. 5, 1987, abandoned.

[51] Int. Cl.$^5$ .............................................. F01M 9/06
[52] U.S. Cl. ....................................... 184/13.1; 384/404
[58] Field of Search ................. 184/11.1, 11.2, 11.3, 184/11.5, 13.1, 31; 384/404, 105, 406

[56] References Cited

U.S. PATENT DOCUMENTS

| | | | |
|---|---|---|---|
| 1,084,922 | 1/1914 | Bentley | 384/406 |
| 1,111,941 | 9/1914 | Bardin et al. | 384/406 |
| 1,173,209 | 2/1916 | Nelson . | |
| 1,466,731 | 9/1923 | Schmidt | 384/405 |
| 1,684,175 | 2/1927 | Eaton . | |
| 2,226,407 | 9/1939 | Bruestle . | |
| 2,285,754 | 6/1942 | Money . | |
| 2,551,973 | 6/1949 | Schuck | 384/404 |
| 2,648,575 | 8/1953 | Anderson | 384/404 |
| 3,223,196 | 12/1962 | Stott | 184/6 |
| 3,324,970 | 6/1964 | McHugh | 184/6 |
| 4,445,592 | 5/1984 | New et al. | 184/6.13 |
| 3,529,698 | 9/1970 | Nelson | 184/13 R |
| 3,635,311 | 1/1972 | Kaufman | 184/11.2 |
| 4,350,011 | 9/1982 | Rogner et al. | 60/337 |
| 4,541,785 | 9/1985 | Hoarler | 417/407 |
| 4,591,024 | 5/1986 | Erickson | 184/11.2 |
| 4,597,679 | 7/1986 | Wlodkowski | 184/11.5 |

FOREIGN PATENT DOCUMENTS

| | | | |
|---|---|---|---|
| 510102 | 2/1955 | Canada | 184/3.1 |
| 443785 | 11/1912 | France | 384/406 |

*Primary Examiner*—Leonard E. Smith

[57] ABSTRACT

A jet spray slinger is provided for lubricating moving parts within a housing. A trough is fixed to or frictionally driven by a rotating shaft. The trough has holes that allow lubricant to be sprayed radially outward as the shaft rotates the trough. Axial holes in the trough or a deflector accomplish axial distribution of the lubricant.

3 Claims, 3 Drawing Sheets

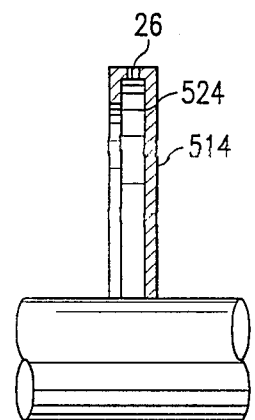
FIG. 5
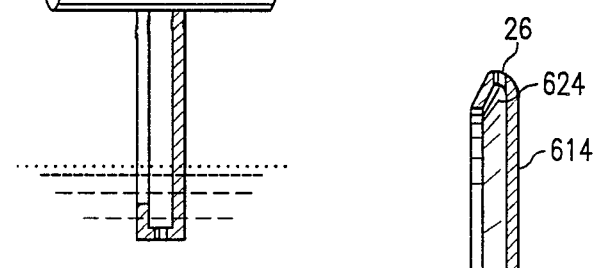
FIG. 6
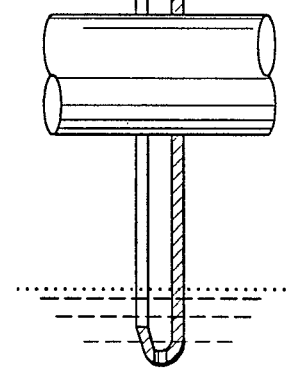
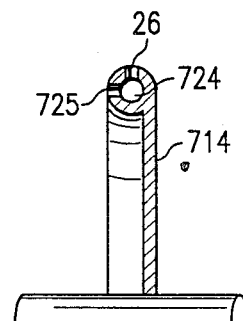
FIG. 7
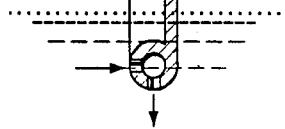

U.S. Patent   Oct. 23, 1990   Sheet 3 of 3   4,964,489

JET SPRAY SLINGER

CROSS REFERENCE TO RELATED APPLICATIONS

This application is a continuation-in-part of my prior application, Ser. No. 117,757, filed on Nov. 5, 1987, now abandoned.

TECHNICAL FIELD This invention relates to lubrication devices and in particular to an oil jet spray slinger, which may be used in conjunction with a deflector.

BACKGROUND ART

Rotating oil slinging devices are well known. These devices are used to lubricate internal parts of a machine by splashing oil. The splashing occurs when a flat disc or some type of protruding object is rotated through an oil reservoir. The splashing oil lands on and lubricates the appropriate moving parts.

Typical of this type device are U.S. Pat. No. 1,083,984, Jan. 13, 1914 to Bruman, and No. 1,173,209, Feb. 29, 1916 to Nelson. Bruman discloses a rotating ring which dips into an oil reservoir and splashes oil on a bearing. Nelson discloses the use of a flywheel to pick up oil and deposit it in an opening to an oil conduit.

U.S. Pat. No. 2,285,754, June 9, 1942 to Money discloses a rotating disc. The disc passes through an oil reservoir and picks up oil. The oil is then deposited into an oil conduit.

These devices spray in a radial direction by picking up oil on the surface of the rotating disc. The amount of oil sprayed is relatively small and becomes less at higher speeds when the need for oil increases. A need thus exists for an oil slinger that will distribute oil radially and axially, at high rotational speeds.

SUMMARY OF THE INVENTION

The jet spray slinger of the present invention picks up oil in a partially closed annular channel, tube or cup. The oil is then sprayed radially outward through holes in the channel, tube or cup. Axial holes provide axial oil flow. In the alternative, axial flow may be accomplished by providing a deflector which diverts the radial flow to the axial direction.

A slinger is fixed to a rotating, generally horizontally extending shaft or alternately is friction driven by a rotating shaft. The generally vertically extending slinger is partially immersed in an oil reservoir. When viewed from the front, the slinger has a shape which can be circular, rectangular, octagonal, or any other appropriate geometric configuration.

The periphery of the plate has a tube, cup or trough fixedly attached to it. The cup can be of many different cross-sectional shapes such as circular, arcuate, rectangular, or angular. Whatever the cross-sectional shape, the cup is at least partially open or has enough holes in it so that the oil in which it is immersed can flow into it.

As the slinger is driven by the rotating shaft, the oil in the cup is thrown outward through the radial holes. This action results in improved distribution of oil and improved cooling of the oil. Outwardly driven oil may be defected into bearings or other parts with a deflector, just as axial holes in the slinger may be utilized for this same purpose.

BRIEF DESCRIPTION OF THE DRAWINGS

For a more complete understanding of the present invention and for further advantages thereof, reference is now made to the following description of the preferred embodiment taken in conjunction with the accompanying drawings in which:

FIGS. 5, 6 and 7 are cross-sectional views of alternate embodiments of slingers;

DESCRIPTION OF THE PREFERRED EMBODIMENTS

Figure 1:
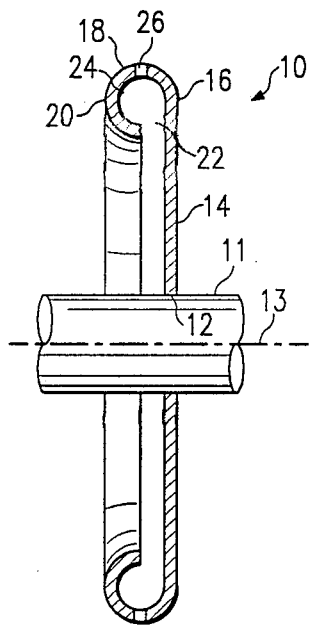
FIG. 1 is a cross-sectional view of a slinger.
Figure 2:
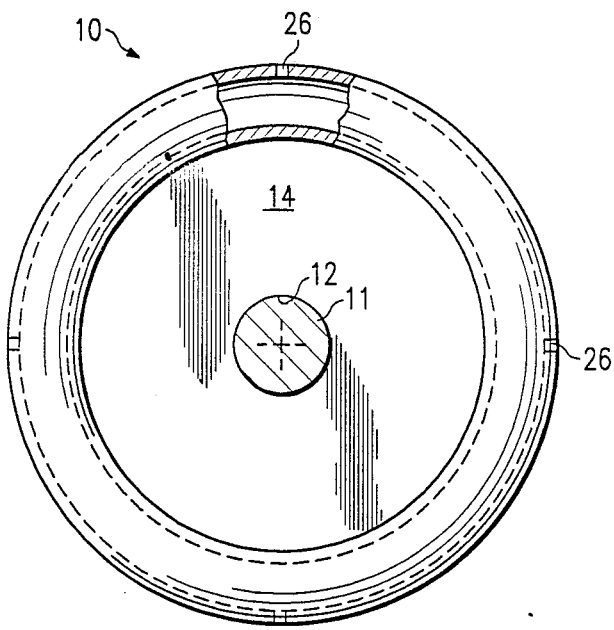
FIG. 2 is a front elevation of a slinger in partial cross section to show one of the radial holes.

Referring to FIG. 1, a jet spray slinger which may be used in the present invention is generally identified by reference numeral 10. A hole 12 passes through the center point of the plate 14 for mounting on a rotating shaft 11. Shaft 11 has a central axis as shown by 13. The slinger may be affixed to a gear (not shown) on the shaft 11. Plate 14 is partially immersed in oil in a reservoir or case. As best seen in FIG. 2, plate 14 has a circular shape when viewed from the front. Plate 14 can also have other various geometrical shapes such as rectangular or octagonal.

Plate 14 has a periphery 16. A rim 18 extends from periphery 16. A sidewall 20 extends inwardly from rim 18. Rim 18 and sidewall 20 form a continuous trough, generally arcuate cross-sectional shaped.

An opening 22 is provided so as to allow oil to flow into the gutter or trough 24 formed by disc 14, rim 18 and sidewall 20. Rim 18 has a plurality of holes 26 so as to allow the oil in cup 24 to spray radially outwardly as plate 14 is spun by rotating shaft 11.

Figure 3:
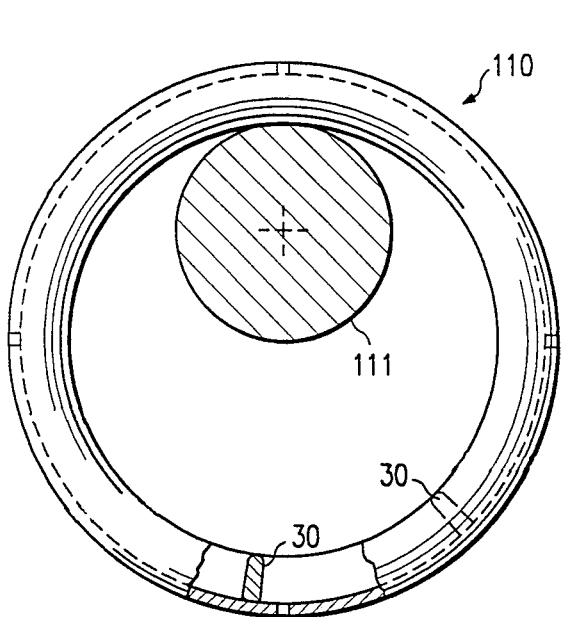
FIG. 3 is a front view of an alternate embodiment of a slinger.
Figure 4:
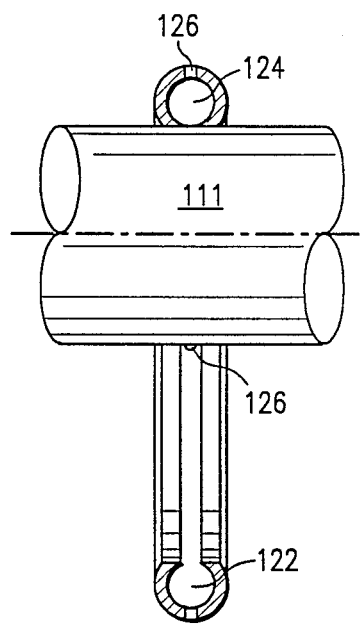
FIG. 4 is a cross-sectional view of FIG. 3.

FIGS. 3 and 4 show an alternate embodiment for driving jet spray slinger 110. Rather than fixing slinger 110 to rotating shaft 111, slinger 110 is friction driven by shaft 111. In addition, internal barriers 30 may be located within the trough. These barriers may be incorporated into the trough design at any of the contemplated embodiments. In a stamped metal embodiment they would be welded in place. In a casting they would be cast in place. As shown by FIG. 4, trough 124 is open on the radially inward side 122. A plurality of holes 126 are provided for slinging oil in a radially outward direction.

FIGS. 5, 6 and 7 show some of the possible alternate embodiments of slingers. FIG. 5 shows plate 514 with a rectangular shaped trough 524; FIG. 6 shows plate 614 with a "V" shaped trough 624; and FIG. 7 shows plate 714 with a tubular trough 724. Axial holes 725 may be provided alone or in conjunction with radial holes.

Figure 8:
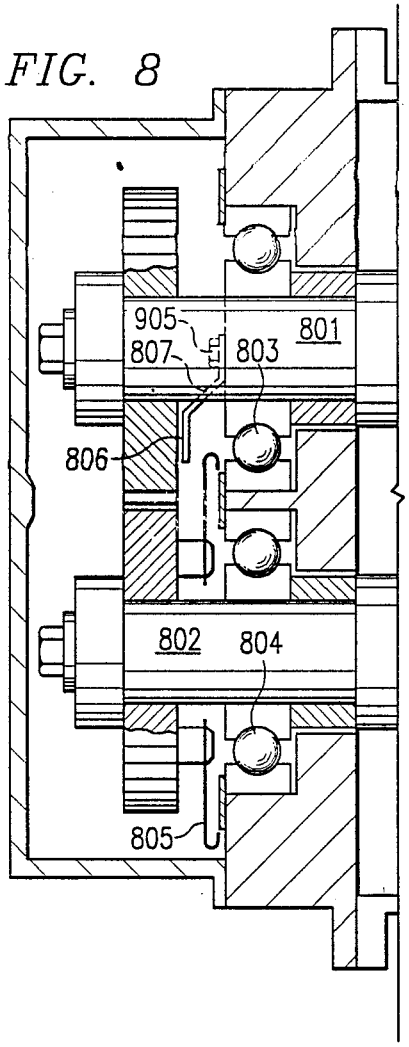
FIG. 8 shows in cross-section, an industrial blower incorporating a slinger and deflector.
Figure 10:
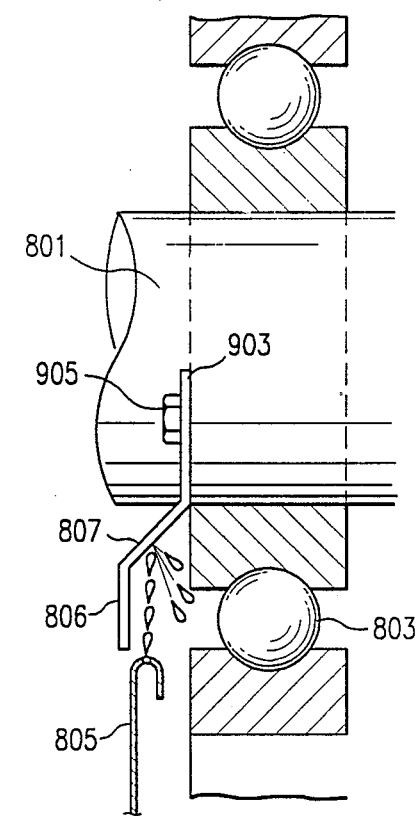
FIG. 10 is a side elevation of a deflector used in conjunction with a slinger.

FIGS. 8 and 10 illustrate how axial oil flow may be obtained from the radial output of a slinger. In an industrial blower parallel shafts 801, 802 each have bearings 803, 804 which require lubrication. The bottom bearing 804 rotates in the sump. The top bearings lubrication needs are provided by a slinger 805 and deflector 806.

Figure 9:
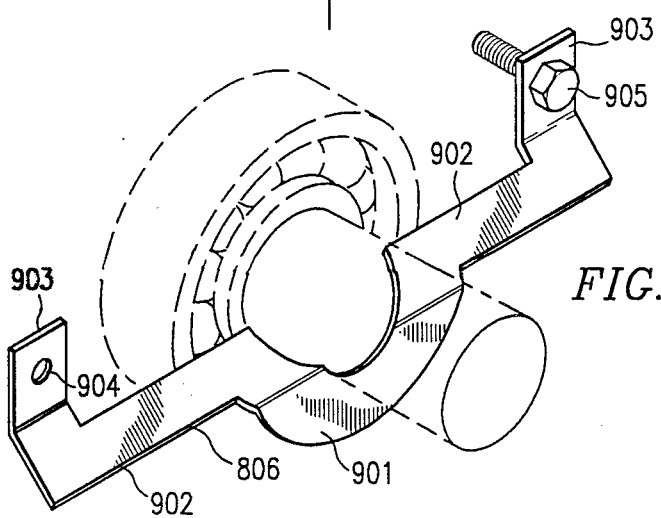
FIG. 9 is a front elevation of a deflector which may be used in conjunction with a slinger.

The outward or radial flow of the slinger impinges substantially planar the angled portion 807 of the deflector and is diverted axially into top bearings 803. As shown in FIG. 9, the deflector includes a U-shaped central portion 901 which goes around the top shaft, an angled portion 902, and ears 903 having bolt holes 904 which accommodate fasteners 905. The deflector is affixed to the case of the blower by the fastener 905.

Although the present invention has been described with respect to a specific preferred embodiment thereof, various changes and modifications may be suggested to one skilled in the art and it is intended that the present invention encompass such changes and modifications as fall within the scope of the claims.

I claim:

1. A lubricating device for attachment to a rotating shaft comprising:
    a circular plate having a central opening adapted to receive the shaft; and
    a peripherally disposed tubular trough, the trough having both radially and axially disposed holes formed therein.

2. In a mechanical apparatus having a lubricant reservoir and a rotatable, generally horizontally extending shaft within a housing, in combination:
    a slinger affixed to the shaft and extending radially outwardly from said shaft so as to be partially immersed in lubricant contained in said reservoir, said slinger being adapted upon rotation by said shaft to spray lubricant radially outwardly from the periphery of the upper portion of said slinger;
    an element positioned in said housing spaced apart from said slinger in a direction parallel to the longitudinal axis of said shaft, said element requiring lubrication; and
    a deflector affixed to the housing and positioned to deflect at least a portion of the radial flow of lubricant form the periphery of said slinger into an axial flow of lubricant onto said element,
    said slinger including a circumferentially extending trough having a plurality of radial openings in the periphery thereof to spray the lubricant radially outwardly from the periphery of the upper portion of said slinger.

3. In a mechanical apparatus having a lubricant reservoir and a rotatable, generally horizontally extending shaft within a housing, in combination:
    a slinger affixed to the shaft and extending radially outwardly from said shaft so as to be partially immersed in lubricant contained in said reservoir, said slinger being adapted upon rotation by said shaft to spray lubricant radially outwardly form the periphery of the upper portion of said slinger;
    an element positioned in said housing spaced apart from said slinger in a direction parallel to the longitudinal axis of said shaft, said element requiring lubrication;
    a second rotatable shaft positioned in said housing, said element comprising a bearing for said second shaft; and
    a deflector affixed to the housing and positioned to deflect at least a portion of the radial flow of lubricant from the periphery of said slinger into an axial flow of lubricant onto said element, said deflector including a substantially planar portion angled with respect to the radial flow generated by the slinger, the angled portion being adapted to deflect said radial flow onto said element, and
    said deflector including a curved portion which partially encircles said second shaft within the housing.

* * * * *